(12) United States Patent
Grand et al.

(10) Patent No.: US 12,110,445 B2
(45) Date of Patent: Oct. 8, 2024

(54) COATED CONDUCTOR

(71) Applicant: Dow Global Technologies LLC, Midland, MI (US)

(72) Inventors: Caroline M. Grand, Phoenixville, PA (US); Bharat I. Chaudhary, Princeton, NJ (US); William C. Francis, Jr., Collegeville, PA (US); Mohamed Esseghir, Lawrenceville, NJ (US)

(73) Assignee: Dow Global Technologies LLC, Midland, MI (US)

( * ) Notice: Subject to any disclaimer, the term of this patent is extended or adjusted under 35 U.S.C. 154(b) by 437 days.

(21) Appl. No.: 17/440,376

(22) PCT Filed: Jun. 2, 2020

(86) PCT No.: PCT/US2020/035634
§ 371 (c)(1),
(2) Date: Sep. 17, 2021

(87) PCT Pub. No.: WO2020/247327
PCT Pub. Date: Dec. 10, 2020

(65) Prior Publication Data
US 2022/0162492 A1    May 26, 2022

Related U.S. Application Data

(60) Provisional application No. 62/856,356, filed on Jun. 3, 2019.

(51) Int. Cl.
*C09D 7/61* (2018.01)
*C09D 5/00* (2006.01)
(Continued)

(52) U.S. Cl.
CPC ............... *C09K 5/14* (2013.01); *C09D 5/00* (2013.01); *C09D 7/61* (2018.01); *C09D 123/0815* (2013.01); *G02B 6/443* (2013.01)

(58) Field of Classification Search
CPC ...... C09D 7/61; C09D 5/00; C09D 123/0815; G02B 6/443
(Continued)

(56) References Cited

U.S. PATENT DOCUMENTS 7,155,092 B2   12/2006   Martinsson et al.
9,321,895 B2   4/2016    Miyata et al.
(Continued)

FOREIGN PATENT DOCUMENTS

| CA | 2729648 A1 * | 1/2010 | ............. C09K 21/02 |
| CN | 1431535 | 7/2003 | |

(Continued)

OTHER PUBLICATIONS

Office Action Report from corresponding Chinese Patent Application No. 202080038156.2 dated Feb. 17, 2023.
(Continued)

*Primary Examiner* — Kaveh C Kianni

(57) ABSTRACT

The present disclosure provides a composition. The composition includes (A) an ethylene-based polymer and (B) from 5 wt % to 15 wt % of a metal hydroxide component, based on the total weight of the composition. The metal hydroxide component includes a metal hydroxide having an aspect ratio greater than, or equal to, 10. The composition has a thermal conductivity greater than 0.52 W m$^{-1}$ K$^{-1}$ and a density less than, or equal to 1.02 g/cc. The present disclosure also provides a coated conductor including a non-metal conductor and a coating on the conductor, the coating containing the composition.

15 Claims, 1 Drawing Sheet

(51) Int. Cl.
    *C09D 123/08*     (2006.01)
    *C09K 5/14*     (2006.01)
    *G02B 6/44*     (2006.01)

(58) Field of Classification Search
    USPC .................................................... 385/123
    See application file for complete search history.

(56) References Cited

U.S. PATENT DOCUMENTS

| | | | | |
|---|---|---|---|---|
| 10,859,330 | B1 * | 12/2020 | Cola | ............. H02S 40/42 |
| 2007/0224423 | A1 | 9/2007 | Lee et al. | |
| 2012/0012363 | A1 | 1/2012 | Cho et al. | |
| 2013/0210988 | A1 | 8/2013 | Miyata et al. | |
| 2015/0000887 | A1 | 1/2015 | Manabe et al. | |
| 2018/0355170 | A1 | 12/2018 | Zhang et al. | |

FOREIGN PATENT DOCUMENTS

| | | | | |
|---|---|---|---|---|
| CN | 1196006 | C | 4/2005 | |
| CN | 101080457 | | 11/2007 | |
| CN | 104151694 | | 11/2014 | |
| CN | 109627538 | | 4/2019 | |
| EP | 0268710 | | 6/1988 | |
| EP | 2837672 | | 2/2015 | |
| EP | 2799485 | B1 | 3/2016 | |
| JP | 2004197030 | A * | 7/2004 | ............. H05K 3/321 |
| JP | 2004279530 | A * | 10/2004 | |
| JP | 2005068388 | | 3/2005 | |
| JP | 3760684 | B2 * | 3/2006 | ............. G03C 1/498 |
| JP | 4223087 | B2 * | 2/2009 | ............. B32B 27/08 |
| JP | 2017082163 | | 5/2017 | |
| WO | 1993005424 | | 3/1993 | |
| WO | WO-2005012435 | A1 * | 2/2005 | ............. C08K 9/02 |
| WO | 2013108937 | | 7/2013 | |

OTHER PUBLICATIONS

Meyer, "Thermal Conductivity of Filled Silicone Rubber and its Relationship to Erosion Resistance in the Inclined Plane Test", IEEE Transactions on Dielectrics and Electrical Insulation, 2004, 11, 620-630.

* cited by examiner

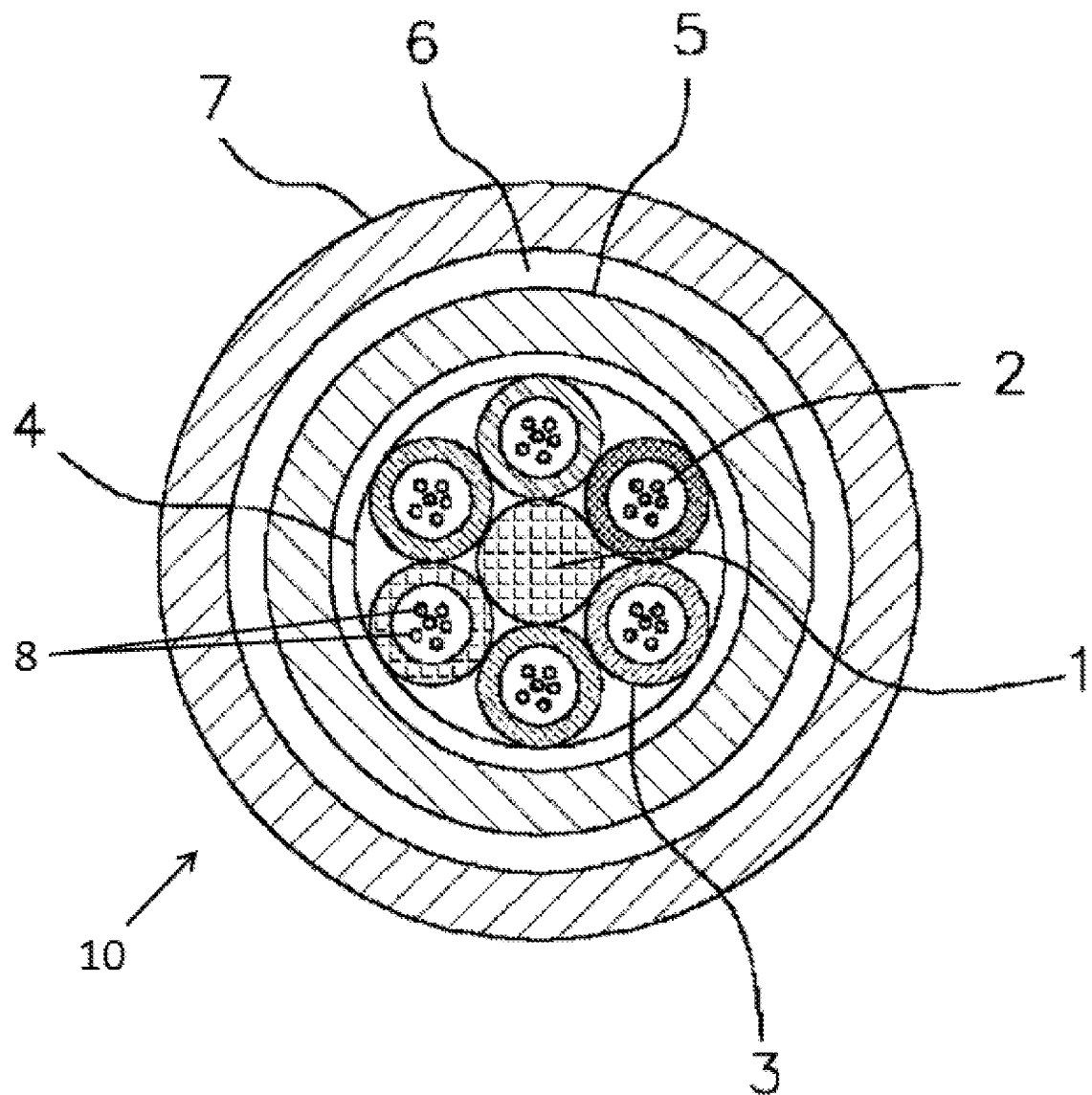

COATED CONDUCTOR

BACKGROUND

Cables, such as all-dielectric self-supporting (ADSS) cables, are a type of conductor which include an inner non-metal conducting element such as a glass fiber, and one or more outer layers for shielding and protecting purposes. The outermost coating, or outermost layer, of the cable is a protective layer typically referred to as the outer sheath or outer jacket.

Known is ethylene-based polymer containing high density fillers for the manufacture of cable jackets to enable good thermal conductivity and track resistance. However, conventional high density fillers, such as metal hydroxide with an aspect ratio of less than 10, are generally known to increase the density of the cable jacket. High density cable jackets are unacceptable in ADSS cable applications where the cable is self-supporting. Additionally, conventional high density fillers, such as metal hydroxide with an aspect ratio of less than 10, are known to decrease the Alternating Current Breakdown Strength (ACBD) of the cable jacket.

The art recognizes the need to provide a composition containing ethylene-based polymer for use in cable jacket applications that exhibits suitable density in combination with suitable thermal conductivity. The art also recognizes the need to provide a composition containing ethylene-based polymer for use in cable jacket applications that exhibits suitable ACBD.

SUMMARY

The present disclosure provides a composition. The composition includes (A) an ethylene-based polymer and (B) from 5 wt % to 15 wt % of a metal hydroxide component, based on the total weight of the composition. The metal hydroxide component includes a metal hydroxide having an aspect ratio greater than, or equal to, 10. The composition has a thermal conductivity greater than 0.52 $W \cdot m^{-1} \cdot K^{-1}$ and a density less than, or equal to 1.02 g/cc.

The present disclosure also provides a coated conductor. The coated conductor includes a non-metal conductor and a coating on the non-metal conductor. The coating contains (A) an ethylene-based polymer and (B) from 5 wt % to 15 wt % of a metal hydroxide component, based on the total weight of the coating. The metal hydroxide component includes a metal hydroxide having an aspect ratio greater than, or equal to, 10. The coating has a thermal conductivity greater than 0.52 $W \cdot m^{-1} \cdot K^{-1}$ and a density less than, or equal to 1.02 g/cc.

BRIEF DESCRIPTION OF THE DRAWINGS

FIG. 1 is a cross-sectional view of a coated conductor in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "all-dielectric self-supporting cable" or "ADSS cable" is an optical fiber cable that is capable of supporting itself between external structures (such as utility poles) without using conductive metal support elements within the cable. ADSS cable may be installed along existing overhead transmission lines, and can share the same external structures as electrical conductors (such as high voltage power lines).

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "conductor" is one or more wire(s), or one or more fiber(s), for conducting heat, light, and/or electricity. The conductor may be a single-wire/fiber or a multi-wire/fiber and may be in strand form or in tubular form. Non-limiting examples of suitable conductors include carbon and various metals, such as silver, gold, copper, and aluminum. The conductor may also be optical fiber made from either glass or plastic. The conductor may or may not be disposed in a protective sheath. A "cable" is a conductor whereby two or more wires, or two or more optical fibers, are bound together, optionally in a common insulation covering. The individual wires or fibers inside the covering may be bare, covered, or insulated. Combination cables may contain both electrical wires and optical fibers. The cable can be designed for low, medium, and/or high voltage applications.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE), medium density polyethylene (MDPE), and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmner™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins, ELITE™ Enhanced Polyethylene Resins, and CONTINUUM™ Bimodal Polyethylene Resins, each available from The Dow Chemical Company; LUPOLEN™, available from LyondellBasell; and HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

A "jacket" is a coating on the conductor.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins and DOWLEX™ polyethylene resins, each available from the Dow Chemical Company; and MARLEX™ polyethylene (available from Chevron Phillips).

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Medium density polyethylene" (or "MDPE") is an ethylene homopolymer, or an ethylene/α-olefin copolymer comprising at least one $C_3$-$C_{10}$ α-olefin, or a $C_3$-$C_4$ α-olefin, that has a density from 0.926 g/cc, or 0.930 g/cc, or 0.935 g/cc to 0.938 g/cc, or 0.940 g/cc.

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene and ELITE AT™ advanced technology resins, each available from The Dow Chemical Company; SURPASS™ Polyethylene (PE) Resins, available from Nova Chemicals; and SMART™, available from SK Chemicals Co.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. A nonlimiting example of a propylene-based polymer (polypropylene) is a propylene/α-olefin copolymer with at least one $C_2$ or $C_4$-$C_{10}$ α-olefin comonomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins and FLEXOMER™ VLDPE resins, each available from The Dow Chemical Company.

Test Methods

Alternating Current Breakdown Strength (also known as AC breakdown, or ACBD) is measured in accordance with ASTM D 149 using a Hipotronics AC Breakdown Tester. Samples are compression molded at 180° C. into a 40 mil (1.0 mm) plaque prior to testing.

Density of the composition and coating is measured in accordance with ASTM D792, with values reported in grams per cubic centimeter (g/cc or g/cm³). Samples are compression molded at 180° C. into plaque discs with a 75 mil (1.9 mm) thickness and a 1 inch (25.4 mm) diameter prior to testing.

Density of the ethylene-based polymer is measured in accordance with ASTM D792, with values reported in grams per cubic centimeter (g/cc or g/cm³).

Initial tracking voltage is measured in accordance with ABNT N BR 10296, Method 2 (equivalent to IEC 60587, Method 2).

Melt index is measured at 190° C. under a load of 2.16 kg according to ASTM D1238, and is reported in grams eluted per 10 minutes (g/10 min).

Shore A Hardness is measured in accordance with ASTM D2240-05.

Shore D Hardness is measured in accordance with ASTM D2240-05.

Specific gravity of the metal hydroxide is measured in accordance with ASTM D4439, with values reported in grams per cubic centimeter (g/cc or g/cm³).

Thermal conductivity is measured in accordance with ISO Standard 22007-2 using a Hot Disk TPS 2500 S apparatus. Samples are compression molded at 180° C. into a 300 mil (7.6 mm) plaque prior to testing. The hot disk sensor is placed between two samples (in a solid form), such that no air gaps are present between the hot disk sensor and the samples. The apparatus supplies a known amount of energy to the initially isothermal sample via the hot disk sensor, and then measures the resulting temperature increase using the hot disk sensor as a thermometer.

Tensile strength and tensile elongation (%) are measured in accordance with ASTM D638 on Type IV dogbones using an Instron Model 4201. Tests are conducted at a crosshead speed of 2 inches per minute (50.8 mm/min), with a jaw span of 2.5 inches (63.5 mm) and a 100 pound (45.4 kg) load cell. Tensile strength is recorded in megaPascals (MPa).

Vicat softening point is measured in accordance with ASTM D 1525.

Average Width, Average Thickness, and Aspect Ratio

The average width and the average thickness of the metal hydroxide is calculated from the arithmetic average of the measured width and measured thickness values, respectively, of ten arbitrary crystallites taken from a scanning electron microscope (SEM) photo of the metal hydroxide.

The aspect ratio is calculated in accordance with the following Equation (A):

$$\text{Aspect Ratio} = \frac{\text{average width}}{\text{average thickness}}. \qquad \text{Equation (A)}$$

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min was used. Each sample is melt pressed into a thin film at 190° C.; the melted sample is then air-cooled to room temperature (25° C.). A 3-10 mg, 6 mm diameter specimen is extracted from the cooled polymer, weighed, placed in a light aluminum pan (50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The values determined are extrapolated onset of melting, $T_m$, and extrapolated onset of crystallization, $T_c$.

Melting point, $T_m$, is determined from the DSC heating curve by first drawing the baseline between the start and end of the melting transition. A tangent line is then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, Tc, is determined from a DSC cooling curve as above except the tangent line is drawn on the high temperature side of the crystallization peak. Where this tangent intersects the baseline is the extrapolated onset of crystallization (Tc).

DETAILED DESCRIPTION

The present disclosure provides a composition. The composition includes (A) an ethylene-based polymer and (B) from 5 wt % to 15 wt % of a metal hydroxide component, based on the total weight of the composition. The metal hydroxide component includes a metal hydroxide having an aspect ratio greater than, or equal to, 10. The composition has a thermal conductivity greater than 0.52 W·m$^{-1}$·K$^{-1}$ and a density less than, or equal to 1.02 g/cc.

A. Ethylene-Based Polymer

The composition contains an ethylene-based polymer.

The ethylene-based polymer can be any ethylene-based polymer disclosed herein.

In an embodiment, the ethylene-based polymer is an ethylene/α-olefin copolymer. Nonlimiting examples of suitable ethylene/α-olefin copolymer include LDPE, MDPE, and linear polyethylene. Nonlimiting examples of linear polyethylene include LLDPE, ULDPE, VLDPE, EPE, ethylene/α-olefin multi-block copolymers (also known as OBC), m-LLDPE, substantially linear, or linear, plastomers/elastomers (POP), and combinations thereof.

The ethylene/α-olefin copolymer contains, consists essentially of, or consists of (i) ethylene and (ii) $C_6$-$C_8$ α-olefin comonomer. In an embodiment, the α-olefin comonomer is selected from hexene and octene. In a further embodiment, the α-olefin is octene.

In an embodiment, the ethylene/α-olefin copolymer contains (i) from greater than 50 wt %, or 60 wt %, or 65 wt % to 80 wt %, or 90 wt % units derived from ethylene; and (ii) a reciprocal amount of units derived from $C_6$-$C_8$ α-olefin comonomer, or from 10 wt %, or 20 wt % to 35 wt %, or 40 wt %, or less than 50 wt % units derived from $C_6$-$C_8$ α-olefin comonomer, based on the total weight of the ethylene/α-olefin copolymer.

In an embodiment, the ethylene/α-olefin copolymer is a MDPE having one, or both of the following properties:

(i) a density from 0.926 g/cc, or 0.930 g/cc to 0.935 g/cc, or 0.940 g/cc; and/or
(ii) a melt index from 0.1 g/10 min, or 0.5 g/10 min, or 0.8 g/10 min to 0.9 g/10 min, or 1.0 g/10 min, or 1.0 g/10 min, or 5.0 g/10 min, or 10 g/10 min, or 20 g/10 min.

In an embodiment, the ethylene/α-olefin copolymer is a VLDPE having one, some, or all of the following properties:

(i) a density from 0.885 g/cc, or 0.900 g/cc to 0.905 g/cc, or 0.910 g/cc, or 0.915 g/cc; and/or
(ii) a melt index from 0.1 g/10 min, or 0.5 g/10 min to 1.0 g/10 min, or 5.0 g/10 min, or 10 g/10 min, or 20 g/10 min; and/or
(iii) a melting temperature, Tm, from 90° C., or 100° C., or 110° C., or 115° C. to 120° C., or 125° C., or 130° C.; and/or
(iv) a Shore A hardness from 80, or 85, or 90 to 95, or 100; and/or
(v) a Vicat softening temperature from 75° C., or 80° C., or 85° C. to 90° C., or 95° C., or 100° C., or 110° C.

In an embodiment, the ethylene/α-olefin copolymer is a LLDPE having one, some, or all of the following properties:

(i) a density from 0.910 g/cc, or 0.915 g/cc, or 0.920 g/cc to 0.925 g/cc, or 0.930 g/cc, or 0.935 g/cc, or 0.940 g/cc; and/or
(ii) a melt index from 1 g/10 min, or 5 g/10 min, or 10 g/10 min, or 15 g/10 min, or 20 g/10 min to 25 g/10 min, or 30 g/10 min, or 40 g/10 min, or 50 g/10 min; and/or
(iii) a melting temperature, Tm, from 90° C., or 100° C., or 110° C., or 115° C., or 120° C., to 125° C., or 130° C.; and/or
(iv) a crystallization temperature, Tc, from 80° C., or 90° C., or 100° C., or 105° C. to 110° C., or 115° C., or 120° C.; and/or
(v) a Vicat softening temperature from 80° C., or 85° C., or 90° C. to 95° C., or 100° C., or 110° C., or 115° C.; and/or
(vi) a Shore D hardness from 40, or 45, or 50 to 55, or 60, or 65, or 70.

In an embodiment, the ethylene/α-olefin copolymer is a blend of MDPE and VLDPE. In another embodiment, the ethylene/α-olefin copolymer is a blend of MDPE, VLDPE, and LLDPE.

The ethylene/α-olefin copolymer may be a functionalized ethylene/α-olefin copolymer. A "functionalized ethylene/α-olefin copolymer" is an ethylene/α-olefin copolymer with a carboxylic acid-based moiety bonded to the ethylene/α-olefin copolymer chain (for example, a carboxylic acid-based moiety grafted to an ethylene/α-olefin copolymer chain). A "carboxylic acid-based moiety" is a compound that contains a carboxyl group (—COOH) or a derivative thereof. Nonlimiting examples of suitable carboxylic acid-based moieties include carboxylic acids and carboxylic acid anhydrides. Nonlimiting examples of suitable carboxylic acids and carboxylic acid anhydrides that can be grafted onto the ethylene/α-olefin copolymer include maleic acid, fumaric acid, itaconic acid, acrylic acid, methacrylic acid, crotonic acid, maleic anhydride (MAH), and itaconic anhydride. The base ethylene/α-olefin copolymer of the functionalized ethylene/α-olefin copolymer may be any ethylene/α-olefin copolymer disclosed herein. In an embodiment, the base ethylene/α-olefin copolymer is a HDPE.

In an embodiment, the functionalized ethylene/α-olefin copolymer is a maleic anhydride-grafted ethylene/α-olefin copolymer. In a further embodiment, the maleic anhydride-grafted ethylene/α-olefin copolymer is a maleic anhydride-grafted HDPE (a "MAH-g-HDPE"). A nonlimiting example of a suitable MAH-g-HDPE is DuPont FUSABOND E265, available from The Dow Chemical Company.

In an embodiment, the maleic anhydride-grafted ethylene/α-olefin copolymer, and further the MAH-g-HDPE, contains, consists essentially of, or consists of (i) ethylene, (ii) $C_4$-$C_8$ α-olefin comonomer, and (iii) MAH. In a further embodiment, the α-olefin comonomer is selected from butene, hexene, and octene. The MAH-g-HDPE has one, some, or all of the following properties:
- (i) a density from 0.945 g/cc, or 0.950 g/cc to 0.955 g/cc, or 0.960 g/cc, or 0.970 g/cc; and/or
- (ii) a melt index from 1 g/10 min, or 5 g/10 min, or 10 g/10 min to 15 g/10 min, or 20 g/10 min; and/or
- (iii) a melting temperature, Tm, from 100° C., or 110° C., or 120° C., or 125° C., or 130° C. to 135° C., or 140° C., or 150° C.

Not wishing to be bound by any particular theory, it is believed that the inclusion of from 1 wt % to 10 wt % of the functionalized ethylene/α-olefin copolymer, and further the MAH-g-HDPE, in the present composition results in (i) more uniform dispersion of the metal hydroxide component in the ethylene-based polymer matrix and (ii) less aggregation of the metal hydroxide component, and thereby results in (iii) the composition exhibiting a higher thermal conductivity (i.e., greater than 0.52 $W·m^{-1}·K^{-1}$).

In an embodiment, the ethylene-based polymer is selected from MDPE, VLDPE, LLDPE, maleic anhydride-grafted ethylene/α-olefin copolymer, and combinations thereof.

In an embodiment, the ethylene-based polymer is a blend containing, consisting essentially of, or consisting of MDPE, VLDPE, and MAH-g-HDPE. In another embodiment, the ethylene-based polymer is a blend containing, consisting essentially of, or consisting of MDPE, VLDPE, LLDPE, and MAH-g-HDPE.

The ethylene-based polymer may comprise two or more embodiments disclosed herein.

B. Metal Hydroxide Component

The composition contains a metal hydroxide component. A "metal hydroxide component" is a component containing a metal hydroxide having an aspect ratio greater than, or equal to, 10.

A "metal hydroxide" is a compound containing at least one metal atom and at least one hydroxyl (—OH) group, that is in a particle form. Nonlimiting examples of suitable metals include magnesium, aluminum, and combinations thereof. Nonlimiting examples of suitable metal hydroxide include magnesium hydroxide, aluminum trihydroxide (also known as aluminum hydroxide), and combinations thereof. In an embodiment, the metal hydroxide is magnesium hydroxide ($Mg(OH)_2$).

In an embodiment, the metal hydroxide component contains, consists essentially of, or consists of: (i) a first metal hydroxide, the first metal hydroxide having an aspect ratio greater than, or equal to, 10 and (ii) a second metal hydroxide, the second metal hydroxide having an aspect ratio less than 10.

i. High Aspect Ratio Metal Hydroxide

The metal hydroxide component contains a metal hydroxide having an aspect ratio greater than, or equal to, 10 (a "High Aspect Ratio Metal Hydroxide").

In an embodiment, the High Aspect Ratio Metal Hydroxide has an aspect ratio greater than 10. In another embodiment, the High Aspect Ratio Metal Hydroxide has an aspect ratio from 10 to 100, or from 10 to 75, or from 10 to 90, or from 10 to 50, or from 10 to 25, or from 20 to 90, or from 30 to 90, or from 40 to 90, or from 40 to 83.

In an embodiment, the High Aspect Ratio Metal Hydroxide has an average thickness from 0.01 μm, or 0.02 μm, or 0.05 μm, or 0.06 μm to 0.07 μm, or 0.10 μm, or 0.15 μm, or 0.5 μm. In another embodiment, the High Aspect Ratio Metal Hydroxide has an average thickness from 0.01 μm to 0.5 μm, or from 0.01 μm to 0.15 μm, or from 0.05 μm to 0.10 μm.

In an embodiment, the High Aspect Ratio Metal Hydroxide has an average width from 4.0 μm, or 4.5 μm to 5.0 μm, or 5.5 μm, or 6.0 μm. In another embodiment, the High Aspect Ratio Metal Hydroxide has an average width from 4.0 μm to 6.0 μm, or from 4.5 μm to 5.0 μm.

In an embodiment, the High Aspect Ratio Metal Hydroxide has a specific gravity from 2.0 g/cc, or 2.4 g/cc to 2.5 g/cc, or 3.0 g/cc, or 4.0 g/cc. In another embodiment, the High Aspect Ratio Metal Hydroxide has a specific gravity from 2.0 g/cc to 4.0 g/cc, or from 2.4 g/cc to 3.0 g/cc.

In an embodiment, the High Aspect Ratio Metal Hydroxide is a magnesium hydroxide having an aspect ratio greater than 10, and the High Aspect Ratio Metal Hydroxide has one, some, or all of the following properties: (i) an average thickness from 0.01 μm to 0.5 μm, or from 0.01 μm to 0.15 μm, or from 0.05 μm to 0.10 μm; and/or (ii) an average width from 4.0 μm to 6.0 μm, or from 4.5 μm to 5.0 μm; and/or (iii) a specific gravity from 2.0 g/cc to 4.0 g/cc, or from 2.4 g/cc to 3.0 g/cc. A nonlimiting example of a suitable High Aspect Ratio Metal Hydroxide is KISUMA 10J, available from Kisuma Chemicals BV.

The High Aspect Ratio Metal Hydroxide may comprise two or more embodiments disclosed herein.

ii. Low Aspect Ratio Metal Hydroxide

In an embodiment, the metal hydroxide component contains a metal hydroxide having an aspect ratio less than 10 (a "Low Aspect Ratio Metal Hydroxide") in addition to the High Aspect Metal Hydroxide.

In an embodiment, the Low Aspect Ratio Metal Hydroxide has an aspect ratio less than 9, or less than 8, or less than 7, or less than 6. In another embodiment, the Low Aspect Ratio Metal Hydroxide has an aspect ratio from 1 to 9, or from 1 to 6, or from 4 to 5.

In an embodiment, the Low Aspect Ratio Metal Hydroxide has an average thickness from 0.15 μm, or 0.20 μm to 0.30 μm, or 0.40 μm, or 0.50 μm. In another embodiment, the Low Aspect Ratio Metal Hydroxide has an average thickness from 0.15 μm to 0.50 μm, or from 0.20 μm to 0.30 μm.

In an embodiment, the Low Aspect Ratio Metal Hydroxide has an average width from 0.15 μm, or 0.20 μm, or 0.40 μm, or 0.50 μm, or 0.60 μm to 0.90 μm, or 1.0 μm, or 2.0 μm. In another embodiment, the Low Aspect Ratio Metal Hydroxide has an average width from 0.15 μm to 2.0 μm, or from 0.60 μm to 0.90 μm.

In an embodiment, the Low Aspect Ratio Metal Hydroxide has a specific gravity from 2.0 g/cc, or 2.4 g/cc to 2.5 g/cc, or 3.0 g/cc, or 4.0 g/cc. In another embodiment, the Low Aspect Ratio Metal Hydroxide has a specific gravity from 2.0 g/cc to 4.0 g/cc, or from 2.4 g/cc to 3.0 g/cc.

In an embodiment, the Low Aspect Ratio Metal Hydroxide is a magnesium hydroxide having an aspect ratio from 1 to 9, or from 1 to 6, or from 4 to 5, and the Low Aspect Ratio Metal Hydroxide has one, some, or all of the following properties: (i) an average thickness from 0.15 μm to 0.50 μm, or from 0.20 μm to 0.30 μm; and/or (ii) an average width from 0.15 μm to 2.0 μm, or from 0.60 μm to 0.90 μm; and/or (iii) a specific gravity from 2.0 g/cc to 4.0 g/cc, or from 2.4 g/cc to 3.0 g/cc. Nonlimiting examples of suitable Low Aspect Ratio Metal Hydroxide include KISUMA 5B-1G and KISUMA 5J, each available from Kisuma Chemicals BV.

The Low Aspect Ratio Metal Hydroxide may comprise two or more embodiments disclosed herein.

The metal hydroxide component contains the High Aspect Ratio Metal Hydroxide. In an embodiment, the metal hydroxide component contains the Low Aspect Ratio Metal Hydroxide in addition to the High Aspect Ratio Metal Hydroxide.

In an embodiment, the metal hydroxide component contains from 40 wt %, or 50 wt % to 60 wt % of the High Aspect Ratio Metal Hydroxide; and a reciprocal amount of the Low Aspect Ratio Metal Hydroxide, or from 40 wt % to 50 wt %, or 60 wt % Low Aspect Ratio Metal Hydroxide, based on the total weight of the metal hydroxide component.

In an embodiment, the metal hydroxide component contains 50 wt % High Aspect Ratio Metal Hydroxide and 50 wt % Low Aspect Ratio Metal Hydroxide, based on the total weight of the metal hydroxide component.

In an embodiment, the metal hydroxide component consists of the High Aspect Ratio Metal Hydroxide.

In an embodiment, the metal hydroxide component, and further the composition, is void of, or substantially void of, Low Aspect Ratio Metal Hydroxide.

The metal hydroxide component may comprise two or more embodiments disclosed herein.

C. Optional Additive

In an embodiment, the composition includes (A) the ethylene-based polymer, (B) the metal hydroxide component, and (C) one or more optional additives.

Nonlimiting examples of suitable additives include carbon black, antioxidants, colorants, ultra violet (UV) absorbers or stabilizers, heat stabilizers, anti-blocking agents, flame retardants, compatibilizers, plasticizers, fillers, processing aids, and combinations thereof.

In an embodiment, the composition contains carbon black. A nonlimiting example of a suitable carbon black is DFNC-0037 BK, available from The Dow Chemical Company. In an embodiment, the coating contains from 1 wt %, or 2 wt % to 3 wt %, or 5 wt %, or 7 wt %, or 9 wt %, or 10 wt % carbon black, based on the total weight of the composition.

In an embodiment, the composition contains an antioxidant. Nonlimiting examples of suitable antioxidants include phenolic antioxidants, thio-based antioxidants, phosphate-based antioxidants, and hydrazine-based metal deactivators. In an embodiment, the composition contains an antioxidant, such as IRGANOX 1010, IRGANOX 1024, CHIMASSORB 944, and/or 4,4'-thiobis(2-t-butyl-5-methylphenol) (TBM-6) in an amount from 0.05 wt %, or 0.1 wt %, or 0.5 wt %, or 1.0 wt % to 1.5 wt %, or 2.0 wt %, or 3.0 wt %, based on the total weight of the composition.

In an embodiment, the composition contains a UV stabilizer. A nonlimiting example of a suitable stabilizer is a hindered amine light stabilizer. In an embodiment, the composition contains from 0.1 wt %, or 0.2 wt % to 0.3 wt %, or 0.4 wt %, or 0.5 wt % stabilizer, based on the total weight of the composition.

In an embodiment, the composition contains a filler. Nonlimiting examples of suitable fillers include zinc oxide, zinc borate, zinc molybdate, zinc sulfide, organo-clay, and combinations thereof. The filler may or may not have flame retardant properties.

In an embodiment, the composition contains a processing aid. Nonlimiting examples of suitable processing aids include oils, organic acids (such as stearic acid), metal salts of organic acids (such as zinc stearate), and fluorinated polymers. In a further embodiment, the composition contains a processing aid in an amount from 0.01 wt %, or 0.02 wt % to 0.05 wt %, or 0.10 wt %, based on total weight of the composition.

In an embodiment, the composition contains a compatibilizer. Nonlimiting examples of suitable compatibilizers include ethylene-vinyl acetate (EVA) copolymer, ethylene-ethyl acrylate (EEA) copolymer, functionalized polyolefins, and combination thereof. In an embodiment, the composition contains from 2 wt %, or 3 wt % to 5 wt %, or 8 wt % compatibilizer, based on the total weight of the composition.

In another embodiment, the composition is void of, or substantially void of, compatibilizer.

In an embodiment, the composition contains an additive selected from carbon black, an antioxidant, a stabilizer, a processing aid, and combinations thereof. In another embodiment, the composition contains an additive selected from carbon black, an antioxidant, and combinations thereof.

In an embodiment, the composition is void of, or substantially void of, flame retardant. It is understood that the magnesium hydroxide component is not a flame retardant in the present composition.

In an embodiment, the composition is void of, or substantially void of, propylene-based polymer.

In an embodiment, the composition is void of, or substantially void of, functionalized ethylene-based polymer.

In an embodiment, the ethylene-based polymer and the antioxidant are the only polymeric compounds present in the composition. In another embodiment, the ethylene-based polymer is the only polymeric compound present in the composition.

In an embodiment, the ethylene-based polymer is the only compound containing ethylene monomer that is present in the composition.

The optional additive may comprise two or more embodiments disclosed herein.

In an embodiment, the composition contains, consists essentially of, or consists of (A) the ethylene-based polymer, (B) the metal hydroxide component, and (C) one or more optional additives.

In an embodiment, the composition contains from 58 wt %, or 60 wt %, or 65 wt %, or 70 wt %, or 75 wt %, or 80 wt % to 85 wt %, or 90 wt %, or 94 wt %, or 95 wt % ethylene-based polymer, based on the total weight of the composition. In another embodiment, the composition contains from 58 wt % to 95 wt %, or from 65 wt % to 94 wt %, or from 80 wt % to 90 wt % ethylene-based polymer, based on the total weight of the composition.

In an embodiment, the composition contains from 1 wt %, or 2 wt %, or 3 wt % to 4 wt %, or 5 wt %, or 6 wt %, or 10 wt % functionalized ethylene-based polymer, based on the total weight of the composition. In another embodiment, the composition contains from 1 wt % to 10 wt %, or from 1 wt % to 5 wt %, or from 4 wt % to 5 wt %, or from 4 wt % to 10 wt % functionalized ethylene-based polymer, based on the total weight of the composition.

Not wishing to be bound by any particular theory, it is believed that the inclusion of greater than 10 wt % functionalized ethylene-based polymer and/or propylene-based polymer in the present composition (based on the total weight of the composition) results in the composition having a density greater than 1.02 g/cc. A density of greater than 1.02 g/cc can be problematic in cable coating applications because increasing the density of the coating contributes to a higher total weight of the coated conductor, which increases the weight load on existing tower structures (preventing existing tower structures from being used without the need for surveys, planning, and/or remedial civil works).

In an embodiment, the composition contains (i) from 50 wt %, or 55 wt %, or 60 wt % to 70 wt %, or 75 wt %, or 80 wt % MDPE; (ii) from 5 wt %, or 10 wt %, or 15 wt % to 20 wt %, or 25 wt %, or 30 wt % VLDPE; and (iii) from 1 wt %, or 2 wt %, or 3 wt % to 4 wt %, or 5 wt %, or 10 wt % LLDPE, based on the total weight of the composition.

In an embodiment, the composition contains (i) from 50 wt %, or 55 wt %, or 60 wt % to 65 wt %, or 75 wt % MDPE; (ii) from 5 wt %, or 10 wt %, or 15 wt % to 20 wt %, or 25 wt %, or 30 wt % VLDPE; (iii) from 1 wt %, or 2 wt %, or 3 wt % to 4 wt %, or 5 wt %, or 10 wt % LLDPE; and (iv) from 1 wt %, or 2 wt %, or 3 wt % to 4 wt %, or 5 wt %, or 6 wt %, or 10 wt % MAH-g-HDPE, based on the total weight of the composition.

The composition contains from 5 wt % to 15 wt % of the metal hydroxide component, based on the total weight of the composition. In an embodiment, the composition contains from 5 wt %, or 8 wt % to 10 wt %, or 13 wt %, or 15 wt % of the metal hydroxide component, based on the total weight of the composition. In another embodiment, the composition contains from 8 wt % to 15 wt %, or from 10 wt % to 15 wt %, or from 12 wt % to 15 wt % of the metal hydroxide component, based on the total weight of the composition. Not wishing to be bound by any particular theory, it is believed that a metal hydroxide component loading greater than 15 wt % metal hydroxide results in a composition that is friable and un-processable, and therefore unsuitable for cable applications.

In an embodiment, the composition contains from 5 wt %, or 6 wt %, or 8 wt %, or 10 wt % to 13 wt %, or 15 wt % of the High Aspect Ratio Metal Hydroxide, based on the total weight of the composition. In another embodiment, the composition contains from 5 wt % to 15 wt %, or from 6 wt % to 15 wt %, or from 8 wt % to 10 wt %, or from 10 wt % to 15 wt % of the High Aspect Ratio Metal Hydroxide, based on the total weight of the composition.

In an embodiment, the composition contains from 5 wt %, or 6 wt %, or 8 wt %, or 10 wt % to 13 wt %, or 15 wt % of the High Aspect Ratio Metal Hydroxide; and from 1 wt %, or 3 wt %, or 5 wt %, or 6 wt % to 7 wt %, or 8 wt %, or 9 wt %, or 10 wt % of the Low Aspect Ratio Metal Hydroxide, based on the total weight of the composition. In another embodiment, the composition contains from 5 wt % to 15 wt %, or from 6 wt % to 15 wt %, or from 8 wt % to 10 wt %, or from 10 wt % to 15 wt % of the High Aspect Ratio Metal Hydroxide; and from 1 wt % to 10 wt %, or from 3 wt % to 8 wt %, or from 6 wt % to 7 wt % of the Low Aspect Ratio Metal Hydroxide, based on the total weight of the composition.

In an embodiment, the composition contains, consists essentially of, or consists of: (A) 58 wt % to 95 wt %, or from 65 wt % to 94 wt %, or from 80 wt % to 90 wt % ethylene-based polymer; (B) from 5 wt % to 15 wt %, or from 8 wt % to 15 wt %, or from 10 wt % to 15 wt %, or from 12 wt % to 15 wt % of the metal hydroxide component; (C) optionally, from 1 wt % to 10 wt %, or from 1 wt % to 5 wt %, or from 2 wt % to 3 wt % carbon black; (D) optionally, from 0.05 wt % to 3.0 wt %, or from 1.0 wt % to 2.0 wt % antioxidant, based on the total weight of the composition.

The composition has a thermal conductivity greater than 0.52 W·m$^{-1}$·K$^{-1}$. In an embodiment, the composition has a thermal conductivity greater than 0.53 W·m$^{-1}$·K$^{-1}$, or greater than 0.54 W·m$^{-1}$·K$^{-1}$, or greater than 0.55 W·m$^{-1}$·K$^{-1}$, or greater than 0.58 W·m$^{-1}$·K$^{-1}$, or greater than 0.60 W·m$^{-1}$·K$^{-1}$, or greater than 0.62 W·m$^{-1}$·K$^{-1}$, or greater than 0.65 W·m$^{-1}$·K$^{-1}$. A thermal conductivity of greater than 0.52 W·m$^{-1}$·K$^{-1}$ is advantageous in cable coating applications because increased thermal activity is one pathway to decrease erosion of the coating due to dry band arcing.

In an embodiment, the composition has a thermal conductivity from greater than 0.52 W·m$^{-1}$·K$^{-1}$, or 0.53 W·m$^{-1}$·K$^{-1}$, or 0.54 W·m$^{-1}$·K$^{-1}$ to 0.70 W·m$^{-1}$·K$^{-1}$, or 0.80 W·m$^{-1}$·K$^{-1}$, or 0.90 W·m$^{-1}$·K$^{-1}$. In another embodiment, the composition has a thermal conductivity from greater than 0.52 W·m$^{-1}$·K$^{-1}$ to 0.90 W·m$^{-1}$·K$^{-1}$, or from greater than 0.52 W·m$^{-1}$·K$^{-1}$ to 0.70 W·m$^{-1}$·K$^{-1}$.

The composition has a density less than, or equal to 1.02 g/cc. In an embodiment, the composition has a density from 0.850 g/cc, or 0.900 g/cc, or 0.950 g/cc, or 0.990 g/cc to 1.000 g/cc, or 1.010 g/cc, or 1.020 g/cc. In another embodiment, the composition has a density from 0.850 g/cc to 1.020 g/cc, or from 0.950 g/cc to 1.020, or from 0.990 g/cc to 1.020, or from 0.990 g/cc to 1.010, or from 0.990 g/cc to 1.000 g/cc. A density of less than, or equal to 1.02 g/cc is advantageous in cable coating applications because reducing the density of the coating contributes to a lower total weight of the coated conductor, which reduces the weight load on existing tower structures (allowing existing tower structures to be used without the need for surveys, planning, and/or remedial civil works).

In an embodiment, the composition has an initial tracking voltage greater than 2.75 kV, or greater than 3.00 kV. In another embodiment, the composition has an initial tracking voltage from 2.50 kV, or 2.75 kV, or 3.00 kV to 3.25 kV, or 3.50 kV, or 4.00 kV.

In an embodiment, the composition has an AC breakdown strength (ACBD) from 40 kV/mm, or 41 kV/mm to 42 kV/mm, or 45 kV/mm, or 50 kV/mm, or 70 kV/mm. In another embodiment, the composition has an ACBD from 40 kV/mm to 70 kV/mm, or from 41 kV/mm to 50 kV/mm.

In an embodiment, the composition has a tensile strength from 13.0 MPa, or 13.8 MPa, or 15.0 M Pa, or 16.0 MPa, or 17.0 MPa, or 18.0 M Pa, or 19.0 MPa to 25.0 MPa, or 27.0 MPa, or 30.0 MPa, or 35.0 MPa. In another embodiment, the composition has a tensile strength from 13.0 MPa to 35.0 MPa, or from 16.0 MPa to 35.0 MPa, or from 19.0 MPa to 30.0 MPa.

In an embodiment, the composition has a tensile elongation from 400%, or 450%, or 475%, or 500% to 1,000%, or 1,500%.

In an embodiment, the composition contains, consists essentially of, or consists of:
(A) 58 wt % to 95 wt %, or from 65 wt % to 94 wt %, or from 80 wt % to 90 wt % ethylene-based polymer, wherein the ethylene-based polymer is a blend containing, consisting essentially of, or consisting of MDPE, VLDPE, LLDPE, and, optionally, MAH-g-HDPE;
(B) from 5 wt % to 15 wt %, or from 8 wt % to 15 wt %, or from 10 wt % to 15 wt %, or from 12 wt % to 15 wt % of the metal hydroxide component, the metal hydroxide component containing, consisting essentially of, or consisting of:
  i. the High Aspect Ratio Metal Hydroxide that is a magnesium hydroxide having an aspect ratio greater than 10, or from 10 to 100, or from 10 to 75, or from 10 to 90, or from 10 to 50, or from 10 to 25, or from 20 to 90, or from 30 to 90, or from 40 to 90, or from 40 to 83, the High Aspect Ratio Metal Hydroxide having one, some, or all of the following properties:
    (a) an average thickness from 0.01 μm to 0.5 μm, or from 0.01 μm to 0.15 μm, or from 0.05 μm to 0.10

μm; and/or (b) an average width from 4.0 μm to 6.0 μm, or from 4.5 μm to 5.0 μm; and/or (c) a specific gravity from 2.0 g/cc to 4.0 g/cc, or from 2.4 g/cc to 3.0 g/cc;
ii. optionally, the Low Aspect Ratio Metal Hydroxide that is a magnesium hydroxide having an aspect ratio from 1 to 9, or from 1 to 6, or from 4 to 5, the Low Aspect Ratio Metal Hydroxide having one, some, or all of the following properties: (a) an average thickness from 0.15 μm to 0.50 μm, or from 0.20 μm to 0.30 μm; and/or (b) an average width from 0.15 μm to 2.0 μm, or from 0.60 μm to 0.90 μm; and/or (c) a specific gravity from 2.0 g/cc to 4.0 g/cc, or from 2.4 g/cc to 3.0 g/cc;
(C) optionally, from 1 wt % to 20 wt %, or from 1 wt % to 10 wt %, or from 1 wt % to 5 wt %, or from 2 wt % to 5 wt % additive, based on the total weight of the composition;
the composition has a thermal conductivity greater than 0.53 $W·m^{-1}·K^{-1}$, or greater than 0.54 $W·m^{-1}·K^{-1}$, or greater than 0.55 $W·m^{-1}·K^{-1}$, or greater than 0.58 $W·m^{-1}·K^{-1}$, or greater than 0.60 $W·m^{-1}·K^{-1}$, or greater than 0.62 $W·m^{-1}·K^{-1}$, or greater than 0.65 $W·m^{-1}·K^{-1}$;
the composition has a density from 0.850 g/cc to 1.020 g/cc, or from 0.950 g/cc to 1.020, or from 0.990 g/cc to 1.020, or from 0.990 g/cc to 1.010, or from 0.990 g/cc to 1.000 g/cc; and
the composition has one, some, or all of the following properties: (i) an initial tracking voltage greater than 2.75 kV, or greater than 3.00 kV; and/or (ii) an ACBD from 40 kV/mm to 70 kV/mm, or from 41 kV/mm to 50 kV/mm; and/or (iii) a tensile strength from 13.0 MPa to 35.0 MPa, or from 16.0 MPa to 35.0 MPa, or from 19.0 MPa to 30.0 MPa; and/or (iv) a tensile elongation from 400% to 1,500%, or from 400% to 1,000%, or from 500% to 1,000%.

It is understood that the sum of the components in each of the compositions and coatings disclosed herein, including the foregoing composition, yields 100 wt %.

The composition may comprise two or more embodiments disclosed herein.

D. Coated Conductor

The present disclosure provides a coated conductor. The coated conductor includes a non-metal conductor and a coating on the non-metal conductor. The coating contains (A) an ethylene-based polymer and (B) from 5 wt % to 15 wt % of a metal hydroxide component, based on the total weight of the coating. The metal hydroxide component includes a metal hydroxide having an aspect ratio greater than, or equal to, 10. The coating has a thermal conductivity greater than 0.52 $W·m^{-1}·K^{-1}$ and a density less than, or equal to 1.02 g/cc.

i. Non-Metal Conductor

The coated conductor includes a non-metal conductor. A "non-metal conductor" is a conductor that is void of, or substantially void of, metal. The non-metal conductor may be a single-wire/fiber or a multi-wire/fiber and may be in strand form or in tubular form. Non-limiting examples of suitable non-metal conductors include optical fiber made from either glass or plastic. The non-metal conductor may or may not be disposed in a protective sheath.

In an embodiment, the non-metal conductor is a cable. A "cable" is a conductor whereby two or more wires, or two or more optical fibers, are bound together, optionally in a common insulation covering. The individual wires or fibers inside the covering may be bare, covered, or insulated. Combination cables may contain both electrical wires and optical fibers. The cable can be designed for low, medium, and/or high voltage applications. In an embodiment, the cable, and further the coated conductor, excludes electrical wires.

The non-metal conductor may comprise two or more embodiments disclosed herein.

ii. Coating

The coated conductor includes a coating on the non-metal conductor. The coating contains (A) an ethylene-based polymer and (B) from 5 wt % to 15 wt % of a metal hydroxide component, based on the total weight of the coating. The metal hydroxide component includes a metal hydroxide having an aspect ratio greater than, or equal to, 10. The coating has a thermal conductivity greater than 0.52 $W·m^{-1}·K^{-1}$ and a density less than, or equal to 1.02 g/cc.

The coating may be any composition disclosed herein.

The coating may be formed by way of melt blending. "Melt blending" is a process whereby at least two components are combined or otherwise mixed together, and at least one of the components is in a melted state. The melt blending may be accomplished by way of batch mixing, extrusion blending, extrusion molding, and any combination thereof.

In an embodiment, the coating is extruded over the non-metal conductor. The extruder has a crosshead die, which provides the desired layer (wall or coating) thickness. A nonlimiting example of an extruder, which can be used is the single screw type modified with a crosshead die, cooling trough and continuous take-up equipment. A typical single screw type extruder can be described as one having a hopper at its upstream end and a die at its downstream end. The hopper feeds into the barrel, which contains a screw. At the downstream end, between the end of the screw and the die are a screen pack and a breaker plate. The screw portion of the extruder is considered to be divided up into three sections, the feed section, the compression section, and the metering section, and multiple heating zones from the rear heating zone to the front heating zone with the multiple sections running from upstream to downstream. The length to diameter ratio of the barrel is in the range of 16:1 to 30:1. Grooved barrel extruders or twin screw extruders can also be employed in the core coating process. The jacketing extrusion process can take place at temperatures in the range from 160° C., or 180° C., or 200° C. to 220° C., or 240° C., or 260° C. The crosshead die distributes the coating composition in a flow channel such that the melted coating composition exits with a uniform velocity and is applied to the conductor. In this way, the blending (melt blending) and the extrusion are performed in the same, single extruder. The conductor passes through the center of the crosshead, and as it exits, a uniform layer of the coating is circumferentially applied using either pressure, or semi-pressure of tube-on tooling. One or more layers of the coating (or other material) can be applied using a multiple crosshead. The coated non-metal conductor is then cooled in a water trough sufficiently to prevent deformation of the applied coating layer on the take-up reel, yielding a coated conductor.

Melt blending may occur sequentially before the extrusion. Alternatively, melt blending may occur simultaneously, or substantially simultaneously, with the extrusion (i.e., melt blending and extrusion occurring in the same extruder). The carbon black may be added during the melt blending and/or during the extrusion.

In an embodiment, the coating is an outermost coating on the non-metal conductor. An "outermost coating" is a layer with an outer surface that is exposed to, or substantially exposed to, ambient environment. The coating may be the sole component surrounding the non-metal conductor. Alternatively, the coating may be the outermost layer of a multilayer jacket or a multilayer sheath encasing the non-metal conductor.

In an embodiment, the coating directly contacts the non-metal conductor. The term "directly contacts," as used herein, is a coating configuration whereby the coating is located immediately adjacent to the non-metal conductor, the coating touches the non-metal conductor, and no intervening layers, no intervening coatings, and/or no intervening structures, are present between the coating and the non-metal conductor.

In another embodiment, the coating indirectly contacts the non-metal conductor. The term "indirectly contacts," as used herein, is a coating configuration whereby an intervening layer, an intervening coating, or an intervening structure, is present between the coating and the non-metal conductor. Nonlimiting examples of suitable intervening layers, intervening coatings, and intervening structures include insulation layers, moisture barrier layers, buffer tubes, and combinations thereof.

In an embodiment, an insulation layer directly contacts the non-metal conductor, and the outermost coating directly contacts the insulation layer. In other words, the coating directly contacts an insulation layer surrounding the non-metal conductor. Nonlimiting examples of suitable insulation layers include foamed insulation layers, thermoplastic insulation layers, crosslinked insulation layers, and combinations thereof.

In an embodiment, the coated conductor includes a plurality of non-metal conductors that are optical fibers, and the optical fibers are disposed in a buffer tube, the coating surrounding the buffer tube. The optical fibers may be disposed in a single buffer tube, or in a plurality of buffer tubes.

In an embodiment, the coating has a thickness from 0.25 mm to 0.50 mm, or 0.60 mm, or 0.70 mm, or 1.00 mm, or 2.00 mm, or 3.00 mm, or 4.00 mm; or from 0.25 mm to 4.00 mm, or from 0.25 mm to 1.00 mm, or from 0.25 mm to 0.50 mm.

FIG. 1 shows a nonlimiting example of a suitable coated conductor 10. The coated conductor 10 includes a first non-metal strength member 1. A nonlimiting example of a suitable first non-metal strength member is glass fiber reinforced plastic. A plurality of buffer tubes 3 are twisted around the non-metal strength member 1. Nonlimiting examples of suitable buffer tubes include polybutylene terephthalate tubes packed with a gel 2 to prevent propagation of water. The buffer tubes 3 contain optical fibers 8 disposed in the gel 2. The optical fibers 8 extend through the buffer tubes 3 and are surrounded by the gel 2. The buffer tubes 3 are contained within an optical buffer tube 4.

An insulation layer 5 surrounds the optical buffer tube 4. The insulation layer 5 directly contacts the optical buffer tube 4. A second non-metal strength member 6 surrounds the insulation layer 5. Nonlimiting examples of suitable second non-metal strength member include glass fiber, aramid yarn, and combinations thereof. The second non-metal strength member 6 directly contacts the insulation layer 5.

An outermost layer 7 surrounds the second non-metal strength member 6. The outermost layer 7 contains the present coating and composition. The outermost layer 7 directly contacts the second non-metal strength member 6.

The coated conductor excludes, or is void of, a metal strength member; and the coated conductor excludes, or is void or, a metal shielding layer.

In an embodiment, the only metal present in the coated conductor is the metal hydroxide component. In other words, the only metal-containing component or metal-containing structure present in the coated conductor is the metal hydroxide component.

In an embodiment, the coated conductor contains, consists essentially of, or consists of:

a non-metal conductor containing an optical fiber;

an outermost coating on the non-metal conductor, the outermost coating containing, consisting essentially of, or consisting of:

(A) 58 wt % to 95 wt %, or from 65 wt % to 94 wt %, or from 80 wt % to 90 wt % ethylene-based polymer, wherein the ethylene-based polymer is a blend containing, consisting essentially of, or consisting of MDPE, VLDPE, LLDPE, and, optionally, MAH-g-HDPE;

(B) from 5 wt % to 15 wt %, or from 8 wt % to 15 wt %, or from 10 wt % to 15 wt %, or from 12 wt % to 15 wt % of the metal hydroxide component, the metal hydroxide component containing, consisting essentially of, or consisting of:

i. the High Aspect Ratio Metal Hydroxide that is a magnesium hydroxide having an aspect ratio greater than 10, or from 10 to 100, or from 10 to 75, or from 10 to 90, or from 10 to 50, or from 10 to 25, or from 20 to 90, or from 30 to 90, or from 40 to 90, or from 40 to 83, the High Aspect Ratio Metal Hydroxide having one, some, or all of the following properties: (a) an average thickness from 0.01 μm to 0.5 μm, or from 0.01 μm to 0.15 μm, or from 0.05 μm to 0.10 μm; and/or (b) an average width from 4.0 μm to 6.0 μm, or from 4.5 μm to 5.0 μm; and/or (c) a specific gravity from 2.0 g/cc to 4.0 g/cc, or from 2.4 g/cc to 3.0 g/cc;

ii. optionally, the Low Aspect Ratio Metal Hydroxide that is a magnesium hydroxide having an aspect ratio from 1 to 9, or from 1 to 6, or from 4 to 5, the Low Aspect Ratio Metal Hydroxide having one, some, or all of the following properties: (a) an average thickness from 0.15 μm to 0.50 μm, or from 0.20 μm to 0.30 μm; and/or (b) an average width from 0.15 μm to 2.0 μm, or from 0.60 μm to 0.90 μm; and/or (c) a specific gravity from 2.0 g/cc to 4.0 g/cc, or from 2.4 g/cc to 3.0 g/cc;

(C) optionally, from 1 wt % to 20 wt %, or from 1 wt % to 10 wt %, or from 1 wt % to 5 wt %, or from 2 wt % to 5 wt % additive, based on the total weight of the outermost coating; and the outermost coating has one, some, or all of the following properties: (i) a thermal conductivity greater than 0.52 $W \cdot m^{-1} \cdot K^{-1}$, or greater than 0.53 $W \cdot m^{-1} \cdot K^{-1}$, or greater than 0.54 $W \cdot m^{-1} \cdot K^{-1}$, or greater than 0.55 $W \cdot m^{-1} \cdot K^{-1}$, or greater than 0.58 $W \cdot m^{-1} \cdot K^{-1}$, or greater than 0.60 $W \cdot m^{-1} \cdot K^{-1}$, or greater than 0.62 $W \cdot m^{-1} \cdot K^{-1}$, or greater than 0.65 $W \cdot m^{-1} \cdot K^{-1}$; and/or (ii) a density from 0.850 g/cc to 1.020 g/cc, or from 0.950 g/cc to 1.020, or from 0.990 g/cc to 1.020, or from 0.990 g/cc to 1.010, or from 0.990 g/cc to 1.000 g/cc; and/or (iii) an initial tracking voltage greater than 2.75 kV, or greater than 3.00 kV; and/or (iv) an ACBD from 40 kV/mm to 70 kV/mm, or from 41 kV/mm to 50 kV/mm; and/or (v) a tensile strength from 13.0 MPa to 35.0 MPa, or from 16.0 MPa to 35.0 MPa, or from 19.0 MPa to 30.0 MPa; and/or (vi) a tensile elongation from 400% to 1,500%, or from 400% to 1,000%, or from 500% to 1,000%.

In an embodiment, the coated conductor is selected from a fiber optic cable, a communications cable (such as a telephone cable or a local area network (LAN) cable), and any combination thereof.

The present coating containing (A) ethylene-based polymer and (B) 5 wt % to 15 wt % metal hydroxide component containing High Aspect Ratio Metal Hydroxide advantageously provides improved thermal conductivity (i.e., greater than 0.52 $W \cdot m^{-1} \cdot K^{-1}$), while maintaining a suitably low density (i.e., less than, or equal to 1.02 g/cc).

By way of example, and not limitation, some embodiments of the present disclosure will now be described in detail in the following Examples.

EXAMPLES

The materials used in the inventive examples and in the comparative samples are provided in Table 1 below.

TABLE 1

Starting materials for compositions

| Component | Specification | Source |
|---|---|---|
| DFH-3580H | medium density polyethylene (MDPE); ethylene/octene copolymer density = 0.9350 g/cc; melt index = 0.80 g/10 min | The Dow Chemical Co. |
| FLEXOMER DFDA-1137 NT 7 | very low density polyethylene (VLDPE) density = 0.905 g/cc; melt index = 1.0 g/10 min; Tm = 118° C.; Shore A = 94; bVicat softening temperature = 86.1° C. | The Dow Chemical Co. |
| DOW DNDA-8320 NT 7 | linear low density polyethylene (LLDPE) density = 0.924 g/cc; melt index = 20 g/10 min; Tm = 123° C.; Tc = 108° C.; Vicat softening temperature = 94° C.; Shore D = 50 | The Dow Chemical Co. |
| DUPONT FUSABOND E265 | maleic anhydride-grafted-high density polyethylene (MAH-g-HDPE) density = 0.95 g/cc; melt index = 12 g/10 min; Tm = 131° C. | The Dow Chemical Co. |
| KISUMA 5B-1G | magnesium hydroxide average thickness = 0.20-0.30 μm; average width = 0.6-1.0 μm; aspect ratio = 4-5; specific gravity = 2.4 g/cc | Kisuma Chemicals BV |
| KISUMA 5J | magnesium hydroxide average thickness = 0.20-0.30 μm; average width = 0.6-1.0 μm; aspect ratio = 4-5; specific gravity = 2.4 g/cc | Kisuma Chemicals BV |
| KISUMA 10J | magnesium hydroxide average thickness = 0.06-0.10 μm; average width = 4.0-5.0 μm; aspect ratio => 10; specific gravity = 2.4 g/cc | Kisuma Chemicals BV |
| DFNC-0037 BK | masterbatch composition containing 45 wt % carbon black; 1.5 wt % processing aid; 0.2 wt % 4,4'-thiobis(2-t-butyl-5-methylphenol) (TBM-6); and 53.3 wt % DOW DNDA-8320 NT 7 (LLDPE) | The Dow Chemical Co. |
| IRGANOX 1010 | hindered phenol antioxidant (CAS 6683-19-8); density = 1.15 g/cc pentaerythritol tetrakis(3-(3,5-di-tert-butyl-4-hydroxyphenyl)propionate) | BASF |
| IRGANOX 1024 | phenolic antioxidant (CAS 32687-78-8); density = 1.11 g/cc 2',3-bis[[3-[3,5-di-tert-butyl-4-hydroxyphenyl]propionyl]]propionohydrazide | BASF |
| CHIMASSORB 944 | hindered amine light stabilizer (CAS 70624-18-9); density = 1.01 g/cc; poly[[6-[(1,1,3,3-tetramethylbutypamino]-1,3,5-triazine-2,4-diyl][(2,2,6,6-tetramethyl-4-piperidinyl)imino]-1,6 hexanediyl[(2,2,6,6-tetramethyl-4-piperidinyl)imino]]) | Ciba Specialty Chemicals |
| DSTDP | thioether antioxidant (CAS 693-36-7) dioctadecyl 3,3'-thiodipropionate | Cytec (Solvay Group) |
| AO mixture | antioxidant masterbatch containing 55.4 wt % IRGANOX 1010, 32.3 wt % DSTDP, 7.7 wt % IRGANOX 1024, and 4.6 wt % CHIMASSORB 944, based on the total weight of the masterbatch | N/A |

In an embodiment, the coated conductor is an all-dielectric self-supporting (ADSS) cable. The ADSS cable is suitable for installation along a high voltage power line (having an operation voltage of at least 150 kV and/or a space potential of at least 4 kV in salty or polluted areas, as measured in accordance with IEEE 1222). The present ADSS cable in which the only metal present in the coated conductor is the metal hydroxide component can advantageously be installed along a high-voltage power line without powering-down the lines. Coated conductors that contain further metallic components or structures, such as a metal strength members and/or metal shielding layer, are unsuitable for ADSS cable because installation along a high-voltage power line would require powering-down the lines.

Compositions are prepared in a Brabender mixing bowl. The DFH-3580H (MDPE) is first loaded into the bowl at 180° C. After the DFH-3580H is melted, FLEXOMER DFDA-1137 NT 7 (VLDPE) is added, followed by mixing for 3 minutes at a temperature of 180° C. Then, DFNC-0037 BK (carbon black masterbatch), magnesium hydroxide (KISUMA 5B-1G, KISUMA 5J, and/or KISUMA 10J), and the AO MB are added to the bowl and mixed for 5 minutes at a temperature of 180° C. The composition is cooled to room temperature (23-25° C.), and then cut into pieces for extrusion.

The composition pieces are loaded into a Brabender Extruder equipped with a Maddock mixing screw with the conditions provided below in Table 2. The composition is fed through a 20/30/100/60/20 mesh screen pack at the end of the extruder. After exiting the extruder, the composition is cooled to room temperature (23-25° C.) and pelletized.

TABLE 2

Brabender Extruder Conditions

| | |
|---|---|
| Heat Zone 1 = 180° C. | Heat Zone 2 = 190° C. |
| Heat Zone 3 = 200° C. | Heat Zone 4 = 210° C. |
| Screw = Maddock mixing screw | Screw RPM = 30 |

The composition and properties of each sample composition are provided in Table 3 below.

As shown in Table 3, CS 10 contains (A) ethylene-based polymer (MDPE and VLDPE), but no metal hydroxide. CS 10 exhibits a thermal conductivity less than 0.52 $W \cdot m^{-1} \cdot K^{-1}$ (0.410 $W \cdot m^{-1} \cdot K^{-1}$). Consequently, CS 10 is unsuitable for ADSS cable applications.

CS 9 contains (A) ethylene-based polymer (MDPE and VLDPE) and (B) 12.5 wt % metal hydroxide component containing metal hydroxide (KISUMA 5J) having an aspect ratio of less than 10 (4-5). CS 9 exhibits (i) a thermal conductivity less than 0.52 $W \cdot m^{-1} \cdot K^{-1}$ (0.508 $W \cdot m^{-1} \cdot K^{-1}$) and (ii) a density greater than 1.02 g/cc (1.021 g/cc). Consequently, CS 9 is unsuitable for ADSS cable applications.

As shown in Table 3, CS 8 contains (A) ethylene-based polymer (MDPE and VLDPE) and (B) greater than 15 wt % (25 wt %) metal hydroxide component containing metal hydroxide (KISUMA 5B-1G) having an aspect ratio of less than 10 (4-5). CS 8 exhibits a density greater than 1.02 g/cc (1.099 g/cc). Consequently, CS 8 is unsuitable for ADSS cable applications.

CS 7 contains (A) ethylene-based polymer (MDPE and VLDPE) and (B) greater than 15 wt % (25 wt %) metal hydroxide component containing metal hydroxide (KISUMA 10J) having an aspect ratio of 10. CS 7 is friable and the properties of CS 7 cannot be measured. Consequently, CS 7 is unsuitable for ADSS cable applications.

In contrast, a composition (Ex 1Ex 6) containing (A) ethylene-based polymer (MDPE and VLDPE) and (B) 5-15 wt % metal hydroxide component containing metal hydroxide (KISUMA 10J) having an aspect ratio of 10 unexpectedly exhibits the combination of (i) a thermal conductivity greater than 0.52 $W \cdot m^{-1} \cdot K^{-1}$ and (ii) a density less than, or equal to 1.02 g/cc. Consequently, Ex 1Ex 6 are suitable for ADSS cable applications.

Ex 1 and CS 9 each contains (A) ethylene-based polymer (MDPE and VLDPE) and (B) 12.5 wt % metal hydroxide component. Ex 1 contains a metal hydroxide (KISUMA 10J) having an aspect ratio of 10, while CS 9 contains a metal hydroxide (KISUMA 5J) having an aspect ratio of less than 10 (4-5). Ex 1 unexpectedly exhibits a 32% increase in thermal conductivity compared to CS 9. Furthermore, Ex 1 exhibits a density less than, or equal to 1.02 g/cc (1.019 g/cc), while CS 9's density is greater than 1.02 g/cc (1.021 g/cc). Consequently, Ex 1 is suitable for ADSS cable applications, while CS 9 is unsuitable for ADSS cable applications.

It is specifically intended that the present disclosure not be limited to the embodiments and illustrations contained herein, but include modified forms of those embodiments including portions of the embodiments and combinations of elements of different embodiments as come with the scope of the following claims.

TABLE 3*

| | Ex 1 | Ex 2 | Ex 3 | Ex 4 | Ex 5 | Ex 6 | CS 7 | CS 8 | CS 9 | CS 10 |
|---|---|---|---|---|---|---|---|---|---|---|
| DFH-3580H (MDPE) | 65.5 | 65.5 | 68.0 | 64.0 | 70.0 | 66.0 | 53.0 | 53.0 | 65.5 | 78.0 |
| FLEXOMER DFDA-1137 NT 7 (VLDPE) | 15.0 | 15.0 | 15.0 | 15.0 | 15.0 | 15.0 | 15.0 | 15.0 | 15.0 | 15.0 |
| DUPONT FUSABOND E265 (MAH-g-HDPE) | — | — | — | 4.0 | — | 4.0 | — | — | — | — |
| KISUMA 10J | 12.5 | 6.25 | 10.0 | 10.0 | 8.0 | 8.0 | 25.0 | — | — | — |
| KISUMA 56-1G | — | — | — | — | — | — | — | 25.0 | — | — |
| KISUMA 5J | — | 6.25 | — | — | — | — | — | — | 12.5 | — |
| DFNC-0037 BK | 5.7 | 5.7 | 5.7 | 5.7 | 5.7 | 5.7 | 5.7 | 5.7 | 5.7 | 5.7 |
| AO mixture | 1.3 | 1.3 | 1.3 | 1.3 | 1.3 | 1.3 | 1.3 | 1.3 | 1.3 | 1.3 |
| Total wt % | 100 | 100 | 100 | 100 | 100 | 100 | 100 | 100 | 100 | 100 |
| Total Carbon Black wt % | 2.6 | 2.6 | 2.6 | 2.6 | 2.6 | 2.6 | 2.6 | 2.6 | 2.6 | 2.6 |
| Total Ethylene-Based Polymer wt % | 83.5 | 83.5 | 86.0 | 86.0 | 88.0 | 88.0 | 71.0 | 71.0 | 83.5 | 96.0 |
| Density (g/cc) | 1.019 | 1.020 | 0.998 | 1.002 | 0.990 | 0.993 | NM | 1.099 | 1.021 | 0.941 |
| Thermal Conductivity ($W \cdot m^{-1} \cdot K^{-1}$) | 0.673 ± 0.0003 | 0.581 ± 0.0008 | 0.558 ± 0.0011 | 0.572 ± 0.0003 | 0.521 ± 0.0008 | 0.531 ± 0.0007 | NM | 0.616 ± 0.0029 | 0.508 ± 0.0006 | 0.410 ± 0.0162 |
| AC Breakdown Strength (kV/mm) | 42 | 41 | NM | NM | NM | NM | NM | 35 | 42 | 34 |
| Tensile Strength (MPa) | 19.6 ± 1.3 | 24.3 ± 0.8 | 16.2 ± 2.9 | 18.7 ± 0.9 | 19.4 ± 2.1 | 19.8 ± 0.7 | NM | 18.2 ± 1.3 | 24.5 ± 1.1 | NM |
| Tensile Elongation (%) | 780 ± 29 | 901 ± 27 | 599 ± 107 | 477 ± 68 | 719 ± 103 | 576 ± 33 | NM | 803 ± 58 | 926 ± 32 | NM |
| Initial Tracking Voltage (kV) | 2.50 | 3.25 | NM | NM | NM | NM | NM | 3.00 | 2.75 | NM |

CS = comparative sample
NM = not measured
wt % in Table 3 is based on the total weight of the respective composition

The invention claimed is:
1. A composition comprising:
(A) an ethylene-based polymer;
(B) from 5 wt % to 15 wt % of a metal hydroxide component, based on the total weight of the composition, the metal hydroxide component comprising a metal hydroxide having an aspect ratio greater than, or equal to, 10; and the composition has a thermal conductivity greater than 0.52 W·m−1·K−1 and a density less than, or equal to 1.02 g/cc.

2. The composition of claim 1, wherein the (A) ethylene-based polymer comprises a medium density polyethylene and a very low density polyethylene.

3. The composition of claim 2, wherein the composition has a thermal conductivity greater than 0.54 W·m−1·K−1.

4. The composition of claim 3, wherein the composition has an initial tracking voltage greater than 2.75 kV.

5. The composition of claim 1 comprising from 10 wt % to 15 wt % of the metal hydroxide, based on the total weight of the composition.

6. The composition of claim 1, wherein the metal hydroxide component comprises a second metal hydroxide having an aspect ratio less than 10.

7. A coated conductor comprising:
a non-metal conductor;
a coating on the non-metal conductor, the coating comprising the composition of claim 1.

8. The coated conductor of claim 7, wherein the coating is an outermost layer.

9. The coated conductor of claim 8, wherein the coating has a thermal conductivity greater than 0.52 W·m−1·K−1 and a density less than, or equal to 1.02 g/cc.

10. The coated conductor of claim 7, wherein the (A) ethylene-based polymer comprises a medium density polyethylene and a very low density polyethylene.

11. The coated conductor of claim 7, wherein the coating has an initial tracking voltage greater than 2.75 kV.

12. The coated conductor of claim 7, wherein the metal hydroxide component comprises a second metal hydroxide having an aspect ratio less than 10.

13. The coated conductor of claim 7, wherein the coating further comprises (C) a maleic anhydride-grafted ethylene-based polymer.

14. The coated conductor of claim 7, wherein the non-metal conductor comprises an optical fiber.

15. A composition comprising:
(A) an ethylene-based polymer;
(B) from 5 wt % to 15 wt % of a metal hydroxide component, based on the total weight of the composition, the metal hydroxide component comprising a metal hydroxide having an aspect ratio greater than, or equal to, 10;
(C) a maleic anhydride-grafted ethylene-based polymer; and
the composition has a thermal conductivity greater than 0.52 W·m−1·K−1 and a density less than, or equal to 1.02 g/cc.

* * * * *